A. KIRBY.
REVERSING VALVE.
APPLICATION FILED MAR. 20, 1916.

1,191,084.

Patented July 11, 1916.

Witnesses
Fenton S. Belt
J. W. Sherwood

Inventor
Arthur Kirby
By Frank H. Hoyt
Attorney

UNITED STATES PATENT OFFICE.

ARTHUR KIRBY, OF UNIONVILLE, MISSOURI.

REVERSING-VALVE.

1,191,084.

Specification of Letters Patent. Patented July 11, 1916.

Application filed March 20, 1916. Serial No. 85,426.

*To all whom it may concern:*

Be it known that I, ARTHUR KIRBY, a citizen of the United States, residing at Unionville, in the county of Putnam and State of Missouri, have invented certain new and useful Improvements in Reversing-Valves; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in reversible check valves and it has for its object to provide a check valve which by its construction may be quickly reversed or turned at such an angle as to completely cut off the flow in either direction, and make repairs to the valve without reducing the pressure in the pipe in which the valve is located.

A further object is to provide a check valve having a valve which, in case of wear, may be turned end for end to present a new valve surface, also in the provision of a valve seat which has two valve seating surfaces and may be turned over to present a new valve seat in case of wear. It will be seen that a check valve constructed in accordance with my invention will give service much longer than a valve of ordinary construction.

The invention comprises various details of construction, combinations and arrangements of parts which will be hereinafter fully described, shown in the accompanying drawings and then specifically defined in the appended claim.

I illustrate my invention in the accompanying drawings, in which:—

Figure 1:
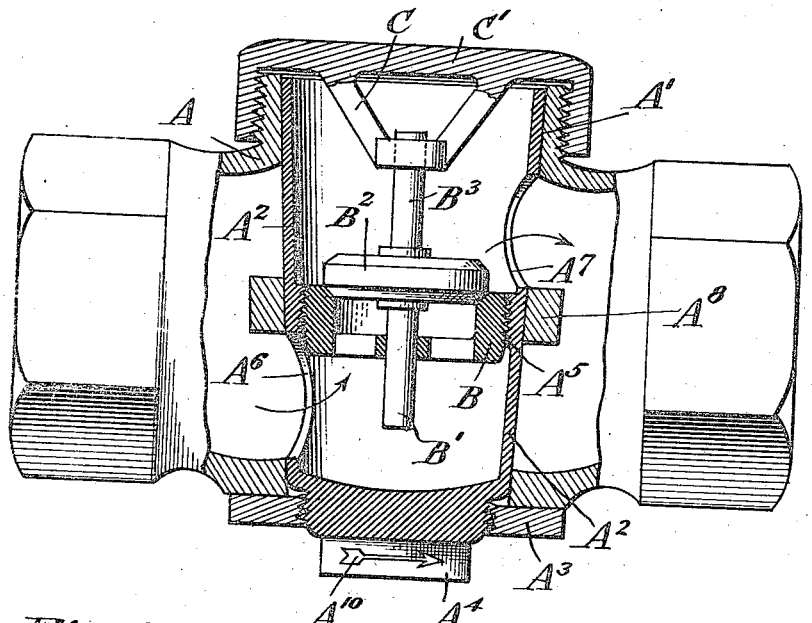
Figure 2:
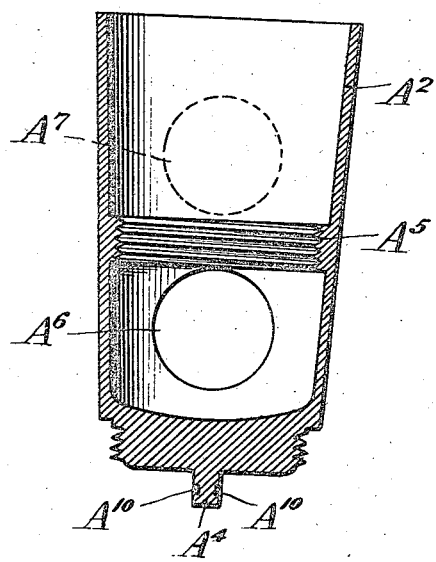

Figure 1 is a vertical section through a check valve constructed in accordance with my invention. Fig. 2 is a vertical section taken at right angles to Fig. 1 through the reversing sleeve, and Fig. 3 is a detail view of a double valve seat.

Reference now being had to the details of the drawings by letter, A designates the valve casing having a central bore $A'$ adapted to receive a sleeve $A^2$ open at its upper end and closed at its lower end, which is slightly reduced in diameter and threaded to receive a lock nut $A^3$. The extreme lower end $A^4$ of the sleeve is formed into such a shape that it may be easily engaged and turned by any suitable tool. The end $A^4$ has stamped in each side thereof an arrow $A^{10}$, as shown, to indicate the direction of flow of liquid through the valve.

Figure 3:
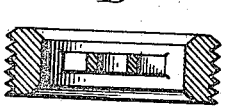

The sleeve $A^2$ about midway its length has internal threads $A^5$ to receive the threads of a valve seat B which may be of the two seat type, shown in Fig. 3, and is provided with a spider to receive and guide one end of the stem of the two faced valve $B^2$, $B'$ of the stem being guided the opposite end $B^3$ of the stem being guided by a suitable spider C extending downward from the cap $C'$ which is secured to the top of the casing A, as shown. The sleeve $A^2$ is provided with an inlet port $A^6$ and an outlet port $A^7$ which are positioned below and above the valve and the central bearing $A^8$ of the valve casing.

In operation, when it is desired to reverse the flow of liquid through the valve, it is only necessary to loosen the lock nut $A^3$ and, by the use of any suitable tool, the sleeve is given a half turn which will position the inlet and outlet ports $A^6$ and $A^7$ opposite that shown in Fig. 1 of the drawings. The arrow $A^{10}$ will at all times indicate the direction of flow. When it is necessary to repair the valve, as in case of wear to the valve or valve seat, it is only necessary to give the sleeve $A^2$ a quarter turn which will cut off the flow or pressure against the valve and then, by removing the cap $C'$, the valve $B^2$ or seat B may be turned over and thus present a new valve or seat surface.

What I claim to be new is:—

A reversible check valve comprising a casing provided with a central bearing which is apertured, a tapering sleeve seated in said casing, closed at one end and circumferentially threaded, its other end open, the inner wall of the sleeve being threaded and provided with diagonally disposed openings positioned above and below the threading, a valve seat engaging the threaded portion on the inner surface of the sleeve, a flanged cap fitted over said casing and having inclined spider arms extending into the open end of the sleeve and terminating in an apertured bearing, a valve having stems projecting from the opposite faces thereof and one having a bearing in said collar and the other in a central aperture in the valve seat.

In testimony whereof I hereunto affix my signature in presence of two witnesses.

ARTHUR KIRBY.

Witnesses:
  MANLEY MCKINLEY,
  ED. STEVENS.